United States Patent
Chen et al.

(10) Patent No.: US 10,894,241 B2
(45) Date of Patent: Jan. 19, 2021

(54) METHOD AND SYSTEM FOR FORMING POLYMER MICROPARTICLES

(71) Applicant: Cytiva BioProcess R&D AB, Uppsala (SE)

(72) Inventors: Lin Chen, Shanghai (CN); Jie Gao, Shanghai (CN); Qiongqiong Huang, Shanghai (CN)

(73) Assignee: Cytiva BioProcess R&D AB, Uppsala (SE)

( * ) Notice: Subject to any disclaimer, the term of this patent is extended or adjusted under 35 U.S.C. 154(b) by 22 days.

(21) Appl. No.: 16/306,749

(22) PCT Filed: Jun. 22, 2017

(86) PCT No.: PCT/EP2017/065426
§ 371 (c)(1),
(2) Date: Dec. 3, 2018

(87) PCT Pub. No.: WO2018/001865
PCT Pub. Date: Jan. 4, 2018

(65) Prior Publication Data
US 2019/0160447 A1     May 30, 2019

(30) Foreign Application Priority Data
Jun. 27, 2016 (CN) .......................... 2016 1 0480908

(51) Int. Cl.
*B01J 13/04* (2006.01)
*B05D 7/24* (2006.01)
*C08L 5/12* (2006.01)

(52) U.S. Cl.
CPC .............. *B01J 13/046* (2013.01); *B05D 7/24* (2013.01); *C08L 5/12* (2013.01); *B05D 2518/00* (2013.01)

(58) Field of Classification Search
None
See application file for complete search history.

(56) References Cited

U.S. PATENT DOCUMENTS

| 3,945,915 A | 3/1976 | Wilson |
| 5,147,895 A | 9/1992 | Hughes et al. |

(Continued)

FOREIGN PATENT DOCUMENTS

| CN | 1907663 A | 2/2007 |
| CN | 101486799 A | 7/2009 |

(Continued)

OTHER PUBLICATIONS

Non-Final Office Action for U.S. Appl. No. 15/564,265 dated Aug. 2, 2019 (9 pages).

(Continued)

*Primary Examiner* — Jeffrey D Washville
(74) *Attorney, Agent, or Firm* — Eversheds Sutherland (US) LLP (57) ABSTRACT

A method for forming polymer microparticles is disclosed. The method comprises spraying a liquid comprising a thermally-gelling polymer from a first orifice of a nozzle into air to form gelled microparticles, and collecting the gelled microparticles with a collecting device. The nozzle is positioned to have a central axis of the first orifice at a tilt angle in a range from about 10 degrees to about 170 degrees relative to a direction of gravity. The collecting device comprises at least two collecting units at different distances from the first orifice of the nozzle in a horizontal direction perpendicular to the direction of gravity. Each of the collecting unit is loaded with a liquid collecting medium. A system for forming polymer microparticles is also disclosed.

18 Claims, 5 Drawing Sheets

(56) References Cited

U.S. PATENT DOCUMENTS

| | | | |
|---|---|---|---|
| 5,223,550 A | 6/1993 | Lughes et al. | |
| 5,662,840 A * | 9/1997 | Thomas | B01J 13/00 |
| | | | 264/12 |
| 6,248,268 B1 | 6/2001 | Cook | |
| 6,602,990 B1 | 8/2003 | Berg | |
| 6,841,097 B2 | 1/2005 | Andersson et al. | |
| 7,237,679 B1 | 7/2007 | Hendrickson et al. | |
| 7,341,682 B2 | 3/2008 | Andersson et al. | |
| 7,396,467 B2 | 7/2008 | Berg et al. | |
| 8,372,286 B2 | 2/2013 | Glad et al. | |
| 8,545,739 B2 | 10/2013 | Cocchietto et al. | |
| 9,656,296 B2 | 5/2017 | Leem et al. | |
| 2002/0164364 A1 | 11/2002 | Quong | |
| 2011/0250264 A1 | 10/2011 | Schutt et al. | |

FOREIGN PATENT DOCUMENTS

| | | |
|---|---|---|
| CN | 102233254 A | 11/2011 |
| WO | 93/12178 A1 | 6/1993 |
| WO | 00/29466 A1 | 5/2000 |
| WO | 01/30146 A1 | 5/2001 |
| WO | 02/12374 A1 | 2/2002 |

OTHER PUBLICATIONS

Schlick Solutions, Module System Range 0/1-0/9, Product Brochur4e, pp. 60-71, no date, available at myschlick.com on Jul. 29, 2019.
PCT International Search Report and Written Opinion for PCT Application No. PCT/EP2017/065426 dated Sep. 13, 2017 (8 pages).
Chinese Office Action for CN Application No. 201610480908.6 dated Jan. 10, 2020 (20 pages with English translation).

* cited by examiner

METHOD AND SYSTEM FOR FORMING POLYMER MICROPARTICLES

CROSS REFERENCE TO RELATED APPLICATIONS

This application claims the priority benefit of PCT/EP2017/065426 filed on Jun. 22, 2017 which claims priority benefit of Chinese Application No. 201610480908.6, filed Jun. 27, 2016. The entire contents of which are hereby incorporated by reference herein.

TECHNICAL FIELD

Embodiments of the present invention relate to a method and system for forming polymer microparticles.

BACKGROUND

A critical step in biomolecular drug manufacture is the separation of "proteins of interest", the active elements in drugs, from other materials. This separation step is mostly based on chromatography technology with suitable separation media. The most widely used separation media in chromatography is polymer microparticles such as polysaccharide beads.

Polysaccharide beads are traditionally produced by emulsion processes, in which an aqueous solution of the polysaccharide is poured into a hydrophobic solvent in a stirring vessel. As the polysaccharide solution and the hydrophobic solvent are immiscible with each other, agitation turns the two liquids into an emulsion with the polysaccharide solution as droplets suspended in the hydrophobic solvent. A water-in-oil emulsifier soluble in the hydrophobic solvent may be added to stabilize the droplets so they do not coalesce into larger ones. The emulsion is then cooled to cause the droplets to gel to form microparticles of the polysaccharide. As the emulsion processes involve use of large amount of environmentally unfriendly solvents such as toluene, intensive washing is needed to remove the solvents in the polysaccharide microparticles in order to meet the downstream application requirement.

Therefore, there is a need to provide a system and method for forming polymer microparticles to solve at least one of the abovementioned problems.

BRIEF DESCRIPTION

In one aspect, a method for forming polymer microparticles comprises spraying a liquid comprising a thermally-gelling polymer from a first orifice of a nozzle into air to form gelled microparticles, and collecting the gelled microparticles with a collecting device. The nozzle is positioned to have a central axis of the first orifice at a tilt angle in a range from about 10 degrees to about 170 degrees relative to a direction of gravity. The collecting device comprises at least two collecting units at different distances from the first orifice of the nozzle in a horizontal direction perpendicular to the direction of gravity. Each of the collecting unit is loaded with a liquid collecting medium.

In another aspect, a system for forming polymer microparticles comprises a nozzle and a collecting device. The nozzle comprises a first orifice and configured to spray a liquid comprising a thermally-gelling polymer from the first orifice into air to form gelled microparticles. The nozzle is positioned to have a central axis of the first orifice thereof at a tilt angle in a range from about 10 degrees to about 170 degrees relative to a direction of gravity. The collecting device is configured to collect the gelled microparticles, and the collecting device comprises at least two collecting units at different distances from the first orifice of the nozzle in a horizontal direction perpendicular to the direction of gravity, wherein each of the at least two collecting units is loaded with a liquid collecting medium.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present invention will be described below. Unless defined otherwise, technical and scientific terms used herein have the same meaning as is commonly understood by one of ordinary skill in the art to which this invention belongs. The terms "a" and "an" do not denote a limitation of quantity, but rather denote the presence of at least one of the referenced items. The term "or" is meant to be inclusive and mean any, some, or all of the listed items. The use of "including," "comprising" or "having" and variations thereof herein are meant to encompass the items listed thereafter and equivalents thereof as well as additional items.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. Additionally, when using an expression of "about a first value—a second value," the about is intended to modify both values. In at least some instances, the approximating language may correspond to the precision of an instrument for measuring the value. Here, and throughout the specification and claims, range limitations may be combined and/or internal changed, such ranges are identified and include all the sub-ranges contained therein unless context or language indicates otherwise.

The present invention relates to a method and system for forming polymer microparticles, such as polysaccharide microparticles. In the method and system, a liquid comprising a thermally-gelling polymer is sprayed from an orifice of a nozzle into air to form gelled microparticles, and the gelled microparticles are collected with a collecting device to form the polymer microparticles. The thermally-gelling polymer refers to a high molecular compound which gels in response to temperature change. The gelled microparticles refers the high molecular compound liquid gelled in spherical or near-spherical shapes. Spraying the liquid from an orifice of a nozzle into air to form gelled microparticles refers to the process of spraying the liquid into the air in the form of small beads and making at least part of the beads gel to form gelled microparticles.

Figure 2:
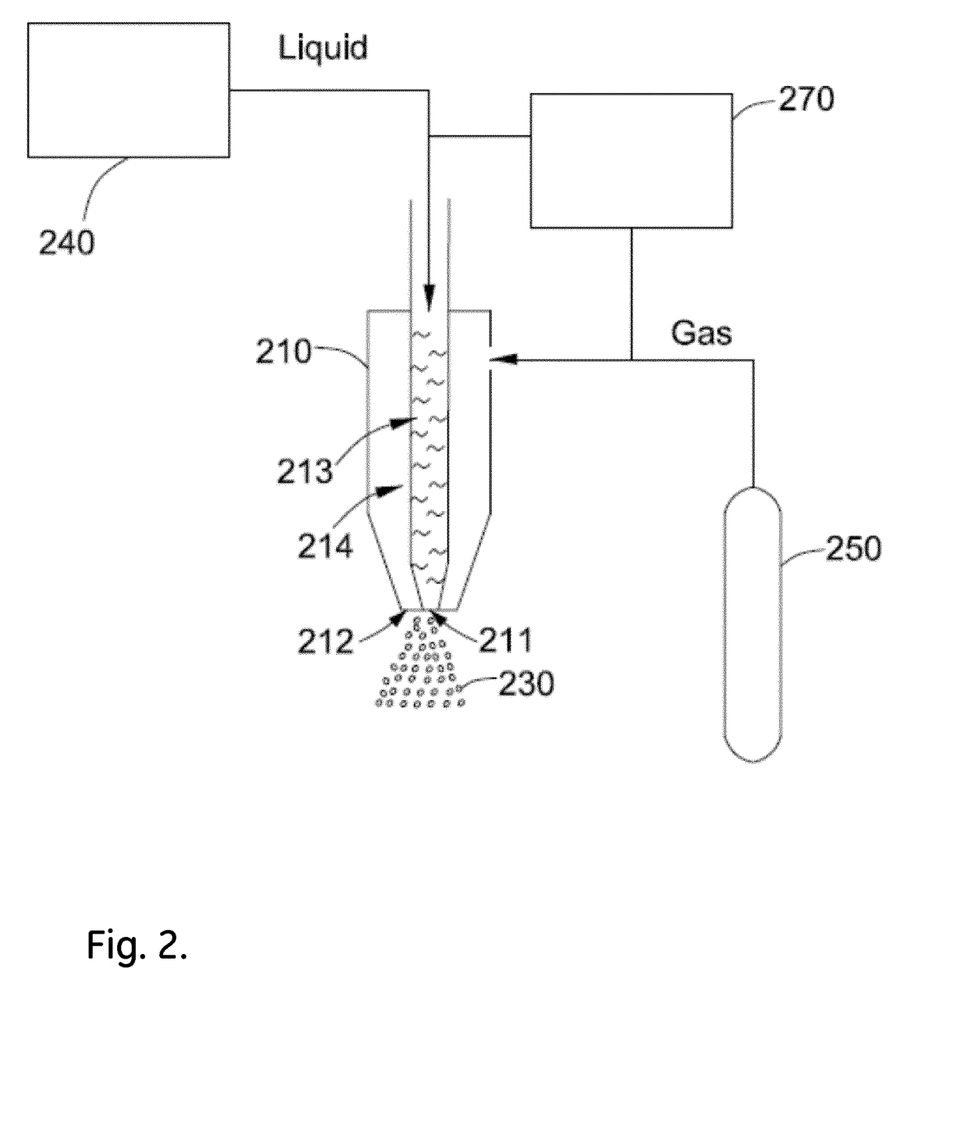
FIG. 2 is a schematic diagram of an external mix two-fluid nozzle for forming polymer microparticles.
Figure 3:
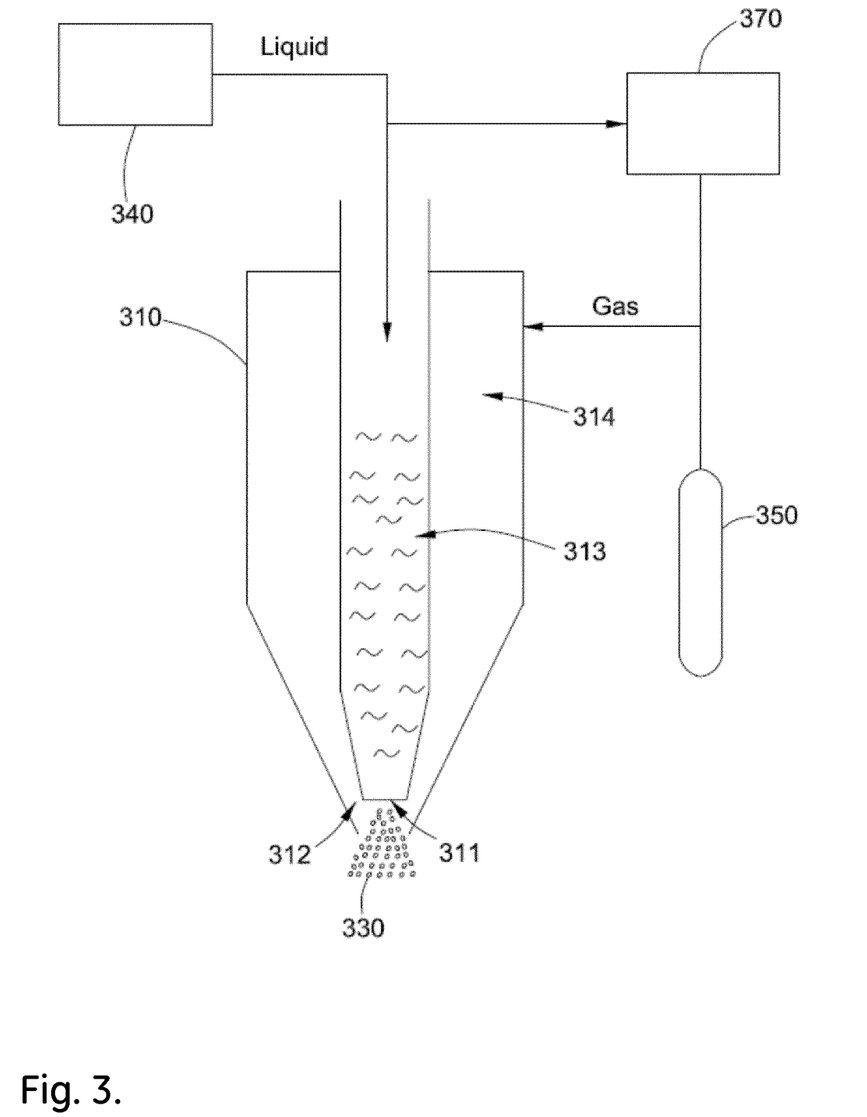
FIG. 3 is a schematic diagram of an internal mix two-fluid nozzle for forming polymer microparticles.

The nozzle is positioned to have a central axis of the orifice at a tilt angle relative to the direction of gravity, wherein the tilt angle is in a range from about 10 degrees to about 170 degrees, or further, in a range from about 10 degrees to about 80 degrees, or further, in a range from about 20 degrees to about 70 degrees. As such, the spraying direction, i.e. an initial movement direction, of the beads and/or the gelled microparticles may be at an appropriate angle relative to the direction of gravity, and trajectories of the beads and/or the gelled microparticles may be parabolic under the effect of gravity, so that the horizontal displacements of the beads and/or the gelled microparticles are relative to their size. The collecting device comprises at least two collecting units, and each of the collecting units is loaded with a liquid collecting medium. In a horizontal direction perpendicular to the direction of gravity, the at least two collecting units are at different distances from the first orifice of the nozzle, so that the polymer microparticles formed at the different collect units may have different size ranges.

The nozzle may be any nozzle devices which can spray a liquid comprising a thermally-gelling polymer into air to form gelled microparticles, including but not limited to single-fluid nozzles, two-fluid nozzles, etc.

As used herein, the "single-fluid nozzle" refers to a single-fluid or hydraulic nozzle which breaks the liquid into droplets or beads by liquid kinetic energy. The term "two-fluid nozzle", which is sometimes called "two-phase nozzle", refers to a nozzle that causes interaction of a gas and a liquid to atomize the liquid. Depending on the position of a mixing point of the liquid and gas streams, relative to a surface of the nozzle, two-fluid nozzles are grouped into internal mix nozzles and external mix nozzles. Structures of several nozzles applicable in the methods and systems of the present disclosure will be described herein below in conjunction with the accompanying drawings.

FIG. 1 is a schematic diagram of a hydraulic nozzle 110. The nozzle 110 generates the liquid kinetic energy by applying a pressure on the liquid by a gas, which causes the liquid to be broken into droplets 130 and sprayed from the orifice 111 of the nozzle. When the nozzle 110 is used in the method and system for forming polymer microparticles, a pressure may be applied by a gas to the liquid comprising the thermally-gelling polymer, to break the liquid into droplets 130, which are sprayed from the orifice 111, and at least partially gelled in the air to form gelled microparticles. The gas may be a gas substantially inert to the liquid comprising the polymer. The gas substantially inert to the liquid comprising the polymer refers to the gas which almost has no chemical reactions with the liquid in the process of forming the polymer microparticles.

The nozzle 110 may be connected to a liquid feeding device 140 and a gas feeding device 150, wherein the liquid feeding device 140 is configured to feed the liquid comprising the polymer to the nozzle 110, and the gas feeding device 150 is configured to feed the gas to the nozzle 110. The nozzle 110 may be also connected to a control device 170, and thus is capable of adjusting and controlling the conditions comprising a pressure of the gas, a temperature of the liquid, etc., by the control device 170.

FIG. 2 is a schematic diagram of an external mix two-fluid nozzle 210. The external mix two-fluid nozzle 210 comprises a first orifice 211 and a second orifice 212, and is configured to spray a liquid comprising a thermally-gelling polymer and a gas substantially inert to the liquid from the first orifice 211 and the second orifice 212, respectively. The fluid from the first orifice 211 interacts with the gas from the second orifice 212 so that the liquid is atomized into mist of beads 230 and at least part of the mist of beads may be gelled to form gelled microparticles. The interaction of the liquid and the gas occurs at a mixing point outside the nozzle 210, and the liquid and gas respectively fed to the first orifice 211 and the second orifice 212 do not interact with each other before they exist the nozzle 210.

FIG. 3 is a schematic diagram of an internal mix two-fluid nozzle 310. The interaction of the liquid and the gas in the internal mix two-fluid nozzle 310 occurs at a mixing point inside the nozzle 310, and the liquid and gas respectively fed to the first orifice 211 and the second orifice 212 interacts with each other to atomize the liquid before they exist the nozzle 210. Comparing with the external mix nozzle, the internal mix nozzle may offer better environment for atomization because the environment at the mixing point inside the internal mix nozzle is more controllable, which may benefit micronization of the liquid.

The nozzle 310 and the nozzle 210 have substantially the same configuration except the locations of the mixing points relative to the nozzle surfaces. The configuration of the nozzle 310 and nozzle 210 will be described in detail hereinafter as an example in conjunction with the drawings. As shown in FIGS. 2 and 3, the nozzle 210/310 includes a first channel 213/313 in fluid communication with the first orifice 211/311, and a second channel 214/314 in fluid communication with the second orifice 212/312. In an embodiment as illustrated, the second channel 214/314 is an annular channel surrounding the first channel 213/313, and the second orifice 212/312 is an annular opening surrounding the first orifice 211/311.

The nozzle 210/310 may be in communication with a liquid feeding device 240/340 and a gas feeding device 250/350. The liquid feeding device 240/340 is configured to feed the liquid comprising the polymer to the first channel 213/313 of the nozzle 210/310, which allows the liquid to flow to the first orifice 211/311. The gas feeding device 250/350 is configured to feed the gas to the second channel 214/314 of the nozzle 210/310, which allows the gas to flow to the second orifice 212/312.

The nozzle 210/310 may be further connected with a control device 270/370 configured to adjust and control conditions for feeding the liquid and gas into the nozzle 210/310 and thereby enable the liquid and gas to be fed into the nozzle 210/310 under different conditions. The adjustable conditions include but are not limited to pressures, temperatures, flow rates, or combinations thereof. In an embodiment, the control device 270/370 enables a mass flow rate ratio between the liquid and the gas to be adjusted in a predetermined range, for example, from about 0.05 to about 20, or further, from about 0.1 to about 10.

Furthermore, the nozzle 210/310 may further include at least one of heating devices and thermo-insulation devices (not shown) thermally coupled to at least one of the liquid feeding device 240/340 and the nozzle 210/310. In some embodiments, the liquid feeding device 240/340 is coupled with a heat-jacket for keeping the temperature of the feeding liquid in the liquid feeding device 240/340. In some embodiments, the nozzle 210 is coupled with a heat-jacket for keeping the temperature of the liquid and gas in the nozzle 210/310.

Figure 1:
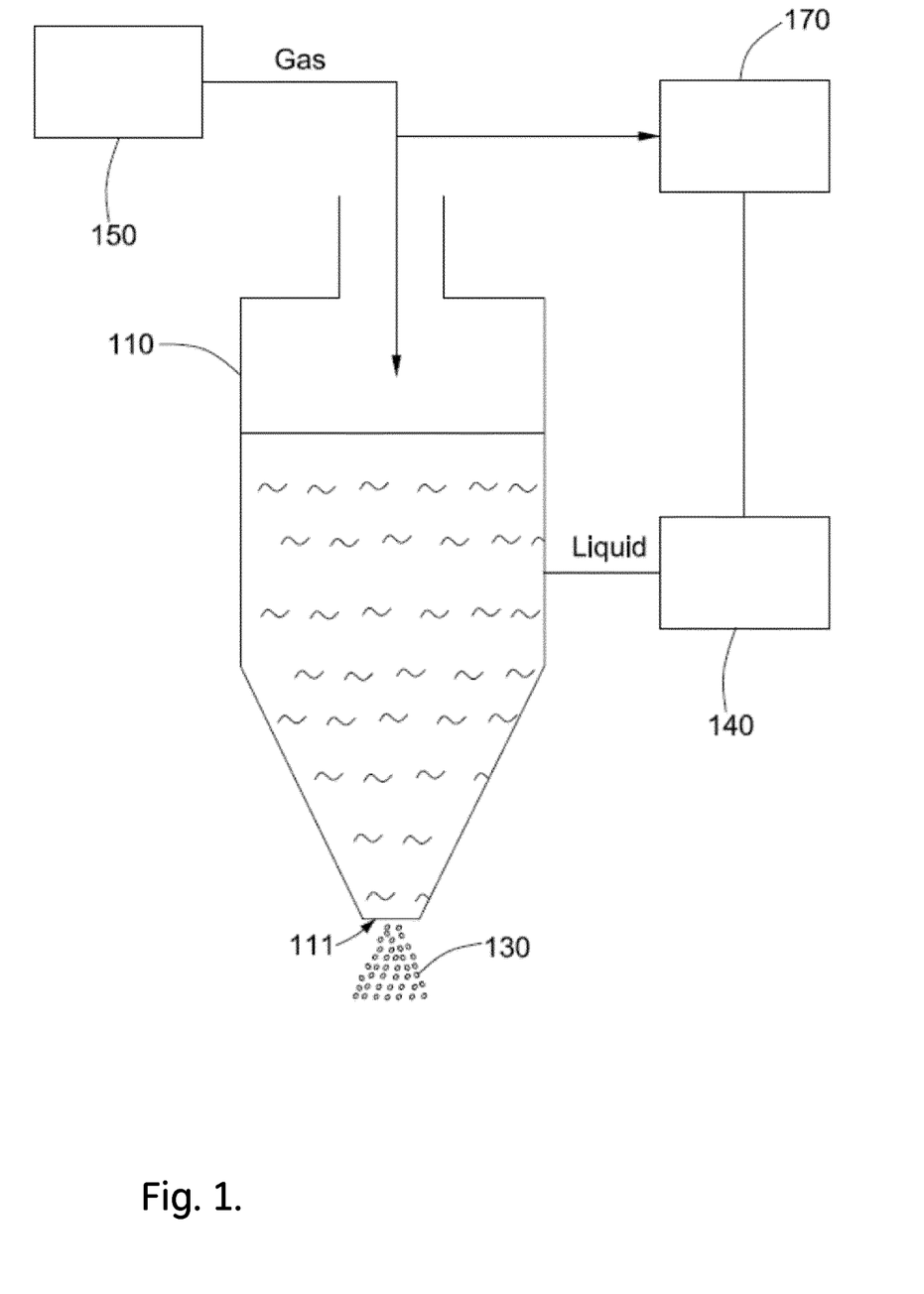
FIG. 1 is a schematic diagram of a hydraulic nozzle for forming polymer microparticles.

The two-liquid nozzle enables the liquid and gas to be independently fed and sprayed, and thus the sizes of the beads can be adjusted and controlled by adjusting feeding conditions of at least one of the liquid and gas. For example, the sizes of the beads may be controlled by adjusting the flow rate ratio between the liquid and the gas. Comparing with a hydraulic nozzle as illustrated in FIG. 1, the two-liquid nozzle offers significant advantages on controlling the sizes of the beads, which makes the sizes of the beads more controllable, and the liquid and gas may be fed at lower pressures with the two-liquid nozzle.

Figure 4:
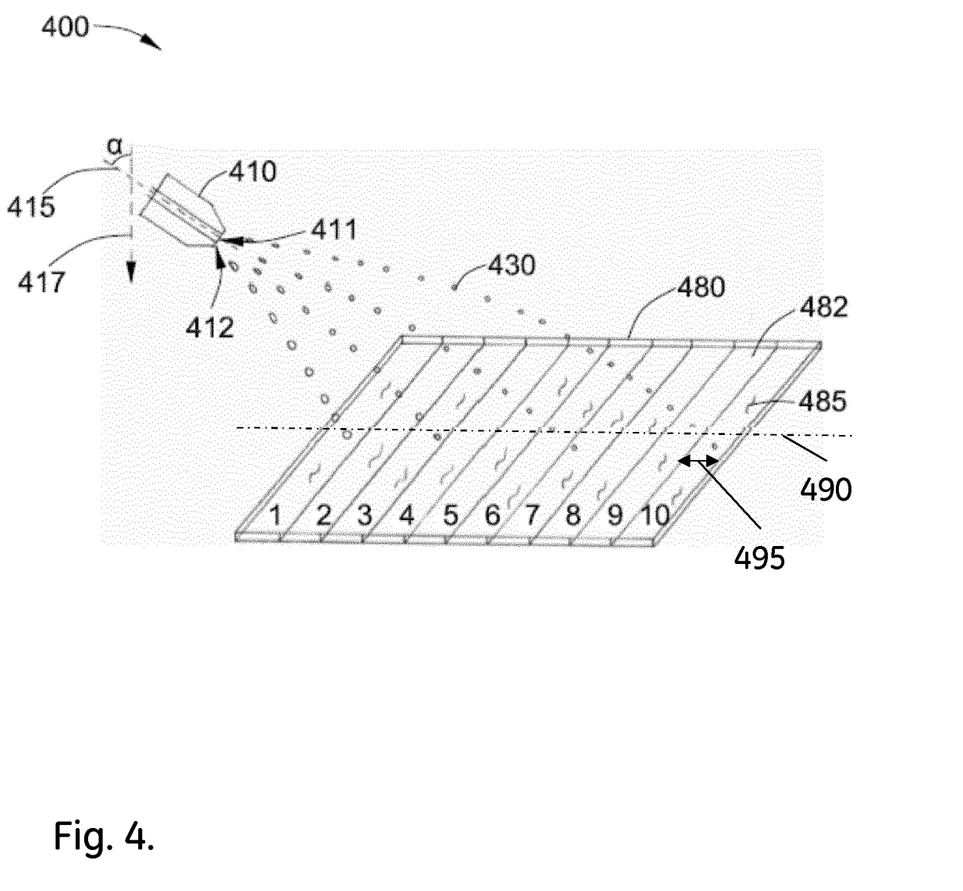
FIG. 4 is a schematic diagram of a system for forming polymer microparticles in accordance with an embodiment of the present invention.

FIG. 4 illustrates an exemplary system 400 for forming polymer microparticles. The system 400 comprises a nozzle 400 and a collecting device 480, wherein the nozzle 410 is configured to spray a liquid comprising a thermally-gelling polymer from a first orifice into air to form gelled microparticles, and the collecting device is configured to collect the gelled microparticles to form the polymer microparticles. Specifically, the nozzle 410 is a nozzle similar to the external mix two-fluid nozzle 210 as shown in FIG. 2, and is configured to spray the liquid and a gas substantially inert to the liquid from a first orifice 411 and a second orifice 412, respectively. The fluid and the gas from the first and the second orifice interacts with each other, so that the liquid is atomized into mist of beads 430. All or part of the beads may be gelled to gelled microparticles, and the gelled microparticles and/or ungelled beads are fed into the collecting device 480 along a certain trajectory. It should be understood that the nozzle 410 may also be replaced with any other suitable nozzles, for example, any one of the nozzles 110, 210, or 310.

The liquid fed to the first orifice 411 may be driven, for example, by siphoning, by hydraulic power, or by a pressured gas that may be the same as or different from the gas fed into the second orifice 412. In some embodiments, the liquid is injected into the nozzle 410 at a temperature in a range from about 65° C. to about 100° C., or preferably in a range from about 75° C. to about 85° C. In some embodiments, the gas is injected into the nozzle 410 at a temperature in a range from about 0° C. to about 60° C., or preferably in a range from about 20° C. to about 50° C. In some embodiments, a mass flow rate ratio between the liquid and the gas is controlled in a desired range, for example, in a range from about 0.05 to about 20, or preferably in a range from about 0.1 to about 10, to obtain polymer microparticles with good particle size distribution.

A spraying direction of the gelled microparticles and/or the beads 430 may be at an appropriate angle to the direction of gravity, and the trajectory of the gelled microparticles and/or the beads 430 is parabolic under the effect of gravity, and thus the horizontal displacement of the gelled microparticle or bead is relative to its size. In some embodiments, the horizontal displacement of the gelled microparticle or bead 430 is in an inverse correlation with its size, and the microparticle or bead with a larger size has a smaller horizontal displacement. For example, when a flow rate of the liquid comprising the polymer at the orifice is lower than a certain flow rate threshold, the smaller the size of the microparticle or bead, the greater horizontal displacement the microparticle or bead can have, and the farther the microparticle or bead can be sprayed. In some embodiments, the horizontal displacement of the gelled microparticle or bead 430 is in a positive correlation with its size, and the microparticle or bead with a larger size has a greater horizontal displacement. For example, when the flow rate of the liquid comprising the polymer at the orifice is higher than a certain flow rate threshold, the larger the size of the microparticle or bead, the greater horizontal displacement the microparticle or bead can have, and the farther the microparticle or bead can be sprayed. The flow rate threshold varies with the properties of the liquid, and specifically, may depend on a viscosity of the liquid and an external driving force (such as pressure) applied to the liquid.

In some embodiments, the angle between the spraying direction of the gelled microparticles and/or beads 430 and the direction of gravity may be controlled by the tilt angle α between the central axis 415 of the orifice and the direction of gravity 417, in a range from about 30 degrees to about 90 degrees, or preferably in a range from about 45 degrees to about 90 degrees, or preferably in a range from about 60 degrees to about 90 degrees.

The collecting device 480 comprises n (n≥2) separated collecting units 482, and each collecting unit is loaded with a liquid collecting medium 485. In a horizontal direction perpendicular to the direction of gravity, the n collecting units are at different distances from the orifice of the nozzle. In some embodiments, the horizontal direction substantially coincides with the horizontal displacement direction of the gelled microparticles and/or beads 430. As such, the beads having different horizontal displacements may drop into different collecting units 482, and thereby the beads with different sizes can be collected separately. Thus, in a continous production process, polymer microparticles in different size ranges may be obtained in different collecting units 482. The number n of the collecting units 482 may be any number greater than or equal to 2, depending on how many size classes the polymer microparticles are required to be divided into. For example, if the polymer microparticles are required to be divided into three size classes, i.e., large, medium and small classes, then three collecting units may be used. In general, if the position of the collecting device 480 relative to the nozzle and the overall size of the collecting device 480 are determined, the more collecting units 482 in the collecting device 480, the smaller size of each signal collecting unit 482, the more size classes that the formed polymer microparticles are divided into, depending on their sizes, and the microparticle sizes in each class are closer to each other. In some embodiments, the method may comprise a step of recovering the microparticles from a plurality of collecting units 482, measuring the particle size distribution in each collecting unit and pooling the recovered microparticles from those collecting units where the particle size distributions comply with a predetermined criterium. The collecting units 482 may be independent from each other or may be integrated in a single device. In some specific embodiments, the collecting device 480 is a vessel that has an upward opening and comprises at least two separated spaces serving as the collecting units, respectively. In some specific embodiments, the collecting unit 482 comprises a row of elongated vessels each having upward opening, which are arranged in a row along the horizontal direction. The elongated vessels are arranged parallel and close to each other to form the collecting device 480. Alternatively, the collecting units may be shaped as annular sectors and arranged concentrically, with the nozzle placed in a centrum point. This ensures that each collecting unit has a constant horizontal distance from the nozzle over its entire length.

In some embodiments, by controlling the relative position between the collecting device 480 and the nozzle 410, and the number and sizes of the collecting units 482, it is possible to make all or part of the gelled microparticles and/or beads 430, for example, the majority of the gelled microparticles and/or beads 430, specifically, above 50% (or 60%, 70%, 80%, 90%) of the gelled microparticles and/or beads 430 drop into the collecting device 480. In some embodiments, the number n of the collecting units is greater than or equal to 3, or greater than or equal to 5, or greater than or equal to 8, or greater than or equal to 10. In some embodiments, the opening size of each of the collecting units, in the horizontal direction, is no more than 2 centimeters, or no more than 1 centimeter. The collecting units may have same or different shapes and sizes. In some embodiments, the collecting units have the same opening size 495 in the horizontal direction 490 from the nozzle (horizontal opening size). In some embodiments, the horizontal opening sizes of the collecting units arranged in the middle is larger than the horizontal opening sizes of the collecting units arranged at the ends.

There is an air interval between the orifices 411, 412 of the nozzle 410 and the collecting medium 485 in the collecting unit 482, and the interaction of the liquid and the gas, the atomization of the liquid and the gelation of the beads may occur in the air interval. In some embodiments, the air interval is configured to allow all or at least a part of the beads to be gelled into microparticles before the beads enter the collecting medium. In some specific embodiments, the orifices 411, 412 are no less than about 5 centimeters, or preferably no less than about 25 centimeters, or more preferably no less than about 50 centimeters from the collecting medium 485, depending on the size and scale of the system 400.

In the specific embodiment as shown in FIG. 4, the collecting device 480 comprises No. 1-10 collecting units 482 arranged in the horizontal direction in an order of increasing distance (horizontal distance) from the orifices of the nozzle 410, wherein the horizontal distance between the No. 1 collecting unit and the orifice is the smallest one, and the horizontal distance between the No. 10 collecting unit and the orifice is the greatest one. A microparticle size distribution can be obtained in each collecting unit. In the direction of gravity, the No. 1-10 collecting units 482 may have the same or different distances from the nozzle 410.

The liquid collecting medium in the collecting units may be any medium capable of collecting the gelled microparticles and/or the beads that have not yet gelled without breaking their structural integrity. In some embodiments, the medium may allow the ungelled beads to be gelled therein to form the gelled microparticles. In some embodiments, the collecting medium comprises water, an alcohol, or a combination thereof. For example, it may be water, an alcohol, combinations of water and an alcohol, combinations of different alcohols, or combinations of water and alcohols. Various environmentally green alcohols can be used. Examples of the applicable alcohols include but are not limited to methanol, ethanol, propanol, isopropanol, n-butanol and combinations thereof. As the collecting medium used in the method and system contains no harmful solvent, the process for forming polymer microparticles is environmental-friendly. Moreover, as intensive washing steps for removing solvent are no longer necessary, the process can be simplified and the cost can be reduced.

The collecting of gelled microparticles and/or beads may be better controlled by controlling the temperature of the collecting medium. In some embodiments, the collecting medium 485 may be maintained at a temperature in a range from about −10° C. to about 80° C., or preferably in a range from about 0° C. to about 50° C., or preferably in a range from about 0° C. to the room temperature. The gelled microparticles and/or beads may be cooled in the air interval between the orifices and the collecting medium, and in some embodiments, may be further cooled in the collecting medium. In some embodiments, microparticles with diameters in a range from about 20 micrometers to about 500 micrometers can be obtained. These beads and microparticles have a roundness and strength sufficient to preserve the structural integrity upon collection thereof, even when the collecting medium includes water or alcohols that are not hydrophobic.

Moreover, the system 400 may further include a dispersing device (not shown) configured to cause the collecting medium 485 to move or disperse in the collecting unit 482. The dispersing device may be any device that is configured to stir the collecting medium 485 or cause the collecting medium 485 to bubble or flow or move in other manners. Examples of the dispersing device include but are not limited to stirrers for stirring the collecting medium 485, devices for causing the collecting medium 485 to bubble in the collecting unit 482, pumps for causing the collecting medium 485 to flow, and combinations thereof. In some embodiments, the collecting medium in the collecting unit may be stirred or caused to flow in order to prevent aggregation.

Through the systems and methods in the embodiments of the present disclosure, the polymer microparticles can be formed and sized simultaneously, and thus the time and labor used for particle sieving can be saved. In addition, since the methods and systems can classify the polymer microparticles according to their sizes in real time, there is no need to control the particle size distribution of the microparticles in a narrow range, thus a wider particle size range may be achieved in one production process.

The systems and methods in the embodiments of the present disclosure are applicable to a wide range of polymers, and particularly applicable to polysaccharides including but not limited to agar, agarose, dextran, cellulose, chitosan, starch, and combinations thereof. A non-limiting example of producing agarose microparticles will be described hereinafter to demonstrate the methods of the present invention.

EXAMPLE

In this example, agarose powder (bought from BioWest Co., Ltd., Spain) was used as the material for preparing the agarose solution, and ethanol (bought from SinoPharm Group Co., Ltd., China) was used as the collecting medium. A dispenser (SU2A, bought from Spraying Systems Co., Ltd., USA) was used as the two-phase spray nozzle to atomize the agarose solution to generate the mist of beads. A peristaltic pump (bought from Spraying Systems Co., Ltd., USA) was used as the liquid feeding device for feeding the agarose solution into the first orifice of the nozzle. An airflow controller with the scale of 100 L/min (CS 230, bought from Beijing SevenStar Electronics Co., Ltd., China) was used as the gas feeding device for feeding the gas to the second orifice of the nozzle.

2000 ml of 4% by weight agarose solution was prepared by adding 80 g of the agarose powder to 1920 mL water. The agarose solution was heated to and stirred at 80° C. for about one to two hours to generate a homogeneous solution. Then the homogeneous agarose solution was poured into a beaker of a capacity of about 3000 mL, which was disposed in a water bath of about 85° C. The homogeneous agarose solution was transferred with the peristaltic pump from the beaker to the nozzle at a flow rate of about 40 mL/min and kept at a temperature in a range from about 75° C. to about 85° C. A stream of air was fed into the nozzle at a flow rate of about 16.0 L/min. The droplets of the agarose solution generated through the nozzle were collected by a collecting device comprising 10 collecting units (similar to the collecting device 480 as shown in FIG. 4). Each of the collecting units contains 95% by volume ethanol solution at about 4° C. or the room temperature, for cooling and collecting the droplets of the agarose solution. During the collecting, the ethanol solution was stirred at 200-300 rpm. Agarose microparticles formed in each of the collecting units were collected by a centrifuge for following estimation or investigation.

Figure 5:
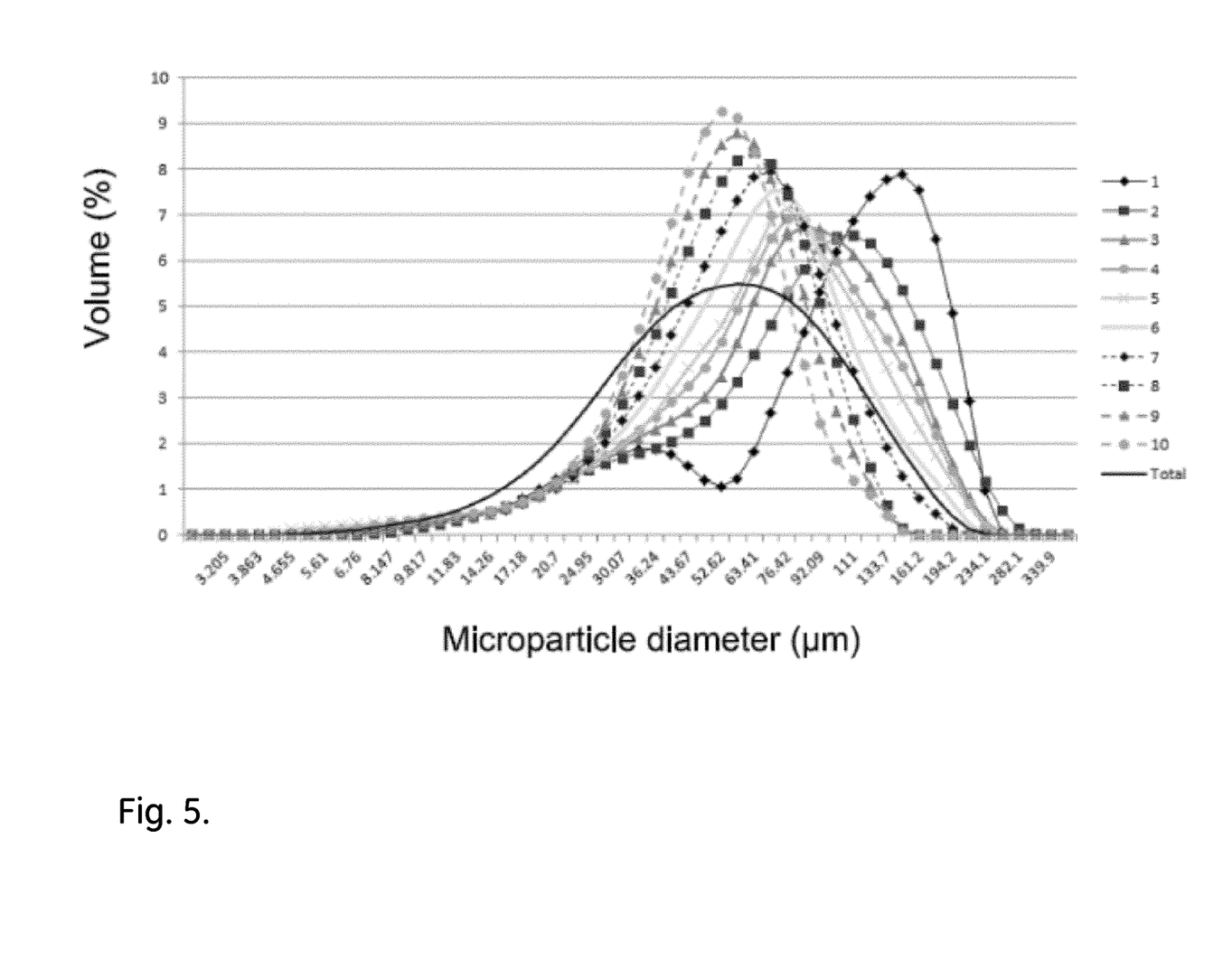
FIG. 5 illustrates particle size distribution curves of agarose microparticles obtained in an example for using a system similar to that of FIG. 4 to form agarose microparticles, each of the curves showing a particle size distribution of agarose microparticles collected in one collecting unit of the system.

A Beckman Coulter particle analyzer was used to measure the particle size distributions of the agarose microparticles (samples 1 to 10) obtained in the No. 1-10 collecting units, respectively. The detailed size distribution data is shown in the Table 1 below. The particle size distribution curves are illustrated in FIG. 5.

TABLE 1

Detailed size distribution data

| Microparticles | Microparticle size distribution (μm) | | | |
|---|---|---|---|---|
| | Mean diameter | Median/D50 | D10 | D90 |
| Sample 1 | 113 | 115 | 28.5 | 191 |
| Sample 2 | 101 | 95.1 | 30.4 | 179 |
| Sample 3 | 89 | 83.4 | 29.2 | 156 |
| Sample 4 | 85.2 | 78.5 | 30.3 | 151 |
| Sample 5 | 80.8 | 74.4 | 27.8 | 144 |
| Sample 6 | 74.5 | 68.8 | 29.8 | 128 |
| Sample 7 | 68.7 | 64.4 | 29.7 | 114 |
| Sample 8 | 61.9 | 59.3 | 29.2 | 98.6 |
| Sample 9 | 58.7 | 56 | 28.5 | 92.3 |
| Sample 10 | 54.7 | 52.4 | 26.8 | 84.8 |

The D values such as D10, D50 and D90 in the Table 1 and FIG. 5 are important parameters of describing particle size distributions. D10 is the value of the particle diameter at 10% in the volume-weighted cumulative distribution. D50 is the value of the particle diameter at 50% in the cumulative distribution, and it is also known as the volume-weighted median diameter or the medium value of the particle size distribution. D90 is the value of the particle diameter at 90% in the cumulative distribution. For example, if D10=28.5 μm, then 10% by volume of the particles in the sample are smaller than 28.5 μm, and if D90=191 μm, then 90% by volume of the particles in the sample are smaller than 191 μm.

It can be seen from Table 1 and FIG. 5 that, 10 agarose microparticle samples in an order of decreasing particle sizes were obtained in the No. 1-10 collecting units in this example, which are arranged in the order of increasing distance from the orifice of the nozzle, and each of the agarose microparticle samples has a good particle size distribution.

The invention may be embodied in other specific forms without departing from the spirit or essential characteristics thereof. The foregoing embodiments are therefore to be considered in all respects as illustrative rather than limiting on the invention described herein.

The scope of embodiments of the invention is thus indicated by the appended claims rather than by the foregoing description, and all changes that come within the meaning and range of equivalency of the claims are therefore intended to be embraced therein.

What is claimed is:

1. A method for forming polymer microparticles, the method comprising:
   spraying a liquid comprising a thermally-gelling polymer from a first orifice of a nozzle into air to form gelled microparticles, the nozzle positioned to have a central axis of the first orifice at a tilt angle in a range from about 10 degrees to about 170 degrees relative to a direction of gravity; and
   collecting the gelled microparticles with a collecting device comprising at least two collecting units at different distances from the first orifice of the nozzle in a horizontal direction perpendicular to the direction of gravity, wherein each of the at least two collecting units is loaded with a liquid collecting medium.

2. The method according to claim 1, wherein the spraying comprises spraying the liquid comprising the thermally-gelling polymer and a gas substantially inert to the liquid from the first orifice and a second orifice of the nozzle, respectively.

3. The method according to claim 2, wherein a mass flow rate ratio between the gas and the liquid is in a range from about 0.1 to about 10.

4. The method according to claim 1, wherein the tilt angle is in a range from about 10 degrees to about 80 degrees.

5. The method according to claim 1, wherein each of the collecting units has a horizontal opening size of no more than 2 centimeters.

6. The method according to claim 1, wherein a distance in the direction of gravity between the orifices and a surface of the liquid collecting medium is in a range from about 25 centimeters to about 5 meters.

7. The method according to claim 1, wherein the tilt angle is in a range from about 10 degrees to about 80 degrees, each of the collecting units has an opening with a size no more than 2 centimeters in the horizontal direction, and a distance in the direction of gravity between the orifices and a surface of the liquid collecting medium is in a range from about 25 centimeters to about 5 meters.

8. The method according to claim 1, wherein the thermally-gelling polymer comprises a polysaccharide.

9. The method according to claim 1, wherein the thermally-gelling polymer comprises agar or agarose.

10. The method according to claim 1, wherein the liquid collecting medium comprises water, alcohol, or a combination thereof.

11. A system for forming polymer microparticles, the system comprising:
    a nozzle comprising a first orifice and configured to spray a liquid comprising a thermally-gelling polymer from the first orifice into air to form gelled microparticles, the nozzle positioned to have a central axis of the first orifice thereof at a tilt angle in a range from about 10 degrees to about 170 degrees relative to a direction of gravity; and
    a collecting device configured to collect the gelled microparticles, the collecting device comprising at least two collecting units at different distances from the first orifice of the nozzle in a horizontal direction perpendicular to the direction of gravity, wherein each of the at least two collecting units is loaded with a liquid collecting medium.

12. The system according to claim 11, wherein the nozzle further comprises a second orifice for spraying a gas substantially inert to the liquid, and the nozzle is configured to cause the gas to interact with the liquid to form the gelled microparticles.

13. The system according to claim 12, further comprising a liquid feeding device configured to feed the liquid into the first orifice of the nozzle, a gas feeding device configured to feed the gas to the second orifice of the nozzle, and a control device configured to enable the liquid and gas to be fed into the nozzle under different conditions comprising pressures, temperatures, flow rates, or combinations thereof.

14. The system according to claim 11, wherein each of the collecting units has a horizontal opening size of no more than 2 centimeters.

15. The system according to claim 11, wherein a distance between the orifices and a surface of the liquid collecting medium in the direction of gravity is in a range from about 25 centimeters to about 5 meters.

16. The system according to claim 11, wherein the tilt angle is in a range from about 10 degrees to about 80 degrees, each of the collecting units has an opening with a size no more than 2 centimeters in the horizontal direction, and a distance in the direction of gravity between the orifices and a surface of the liquid collecting medium is in a range from about 25 centimeters to about 5 meters.

17. The system according to claim 10, wherein the liquid collecting medium comprises water, alcohol, or a combination thereof.

18. The method according to claim 1, wherein the tilt angle is in a range from about from about 60 degrees to about 90 degrees.

* * * * *